United States Patent [19]
Feinbloom et al.

[11] Patent Number: 5,166,823
[45] Date of Patent: Nov. 24, 1992

[54] TELESCOPE HAVING A REMOVABLE HOLDING RING ASSEMBLY

[75] Inventors: Richard E. Feinbloom; Thomas Sachs, both of New York, N.Y.

[73] Assignee: Designs for Vision Inc., Ronkonkoma, N.Y.

[21] Appl. No.: 883,221

[22] Filed: May 7, 1992

Related U.S. Application Data

[63] Continuation-in-part of Ser. No. 780,635, Oct. 23, 1991, abandoned.

[51] Int. Cl.⁵ ............................ G02B 7/02; G02B 23/16
[52] U.S. Cl. ........................................ 359/399; 359/812; 359/815; 359/827; 63/1.1
[58] Field of Search ............... 359/811, 812, 815, 817, 359/399, 409, 516, 517, 816, 818, 827; D11/2, 26, 28; 63/1.1, 15

[56] References Cited

U.S. PATENT DOCUMENTS

| | | | |
|---|---|---|---|
| D. 206,684 | 1/1967 | Bevilacqua | D11/2 |
| 1,025,057 | 4/1912 | Hampson | 359/815 |
| 3,428,286 | 2/1969 | Del Pesco | 359/815 X |
| 3,955,884 | 5/1976 | Del Pesco, Sr. | 359/815 X |
| 4,946,257 | 8/1990 | Feinbloom et al. | 359/399 |

Primary Examiner—Bruce Y. Arnold
Assistant Examiner—David R. Parsons
Attorney, Agent, or Firm—Arthur L. Plevy

[57] ABSTRACT

A telescope housing has a removable finger accommodating ring secured thereto. The ring is coupled to the housing by a post having left and right flanges with upstanding distal ends opposedly projecting from one end of the post to be inserted into an aperture located in a latch on the ring. In this manner, various telescope assemblies of different magnification can be accommodated by the use of the removable ring which also enables convenient storage.

7 Claims, 1 Drawing Sheet

TELESCOPE HAVING A REMOVABLE HOLDING RING ASSEMBLY

BACKGROUND OF THE INVENTION

This is a continuation-in-part of prior Ser. No. 07/780,635 filed on Oct. 23, 1991, now abandoned.

This invention relates to a telescope and more particularly to a telescope housing held via a finger accommodating ring.

Reading telescopes are telescopic systems designed for occupation and reading distances. They allow an increased working distance from that which is found with a comparably powered microscope (reading lens) while still maintaining adequate magnification levels. Essentially many people in various occupations utilize such telescopes to perform tasks requiring increased visual acuity. The usefulness of these units; however, should not be considered limited to low vision patients. Anyone who requires more than normal visual acuity would benefit from such telescopic aids.

There are many different types of reading telescopes which are available and these telescopes are provided in various magnifications such as for example 2 to 8 times magnification or more, and such telescopes can be focused at any working distance. As one can ascertain, a telescope is often said to enlarge things or bring objects nearer. Actually a telescope decreases the visual angle. In principle all refracting telescopes comprise an objective which is directed towards the object to be observed and an ocular (eyepiece), to which the observer applies his eye. The rays coming from the distant object are almost parallel and they converge to form an image at the focus of the objective lens.

There are many different types of telescopes such as the Galilean, which was named after Galileo, and in such a telescope the ocular is a diverging lens. Other telescopes, designated as Keplerian telescope have a convergent lens for its ocular. As is known, telescopes are widely employed to enhance visual acuity as indicated above.

In order to utilize a telescope efficiently, it is convenient to have the telescope supported by means of a ring through which a finger of the user is inserted. When the telescope is not being used it is desirable to have the ring removable so that the entire unit can be compactly stored or transported. The use of a removable ring also allows the user to employ and interchange telescopes of different powers.

The foregoing is the concept of the closest prior art which is seen to be U.S. Pat. No. 4,946,257 having the same inventors and the same assignee. However, the present invention discloses a new and different approach to securing the holding ring assembly to the telescope assembly.

SUMMARY OF THE INVENTION

A telescope apparatus comprising a telescope assembly housing containing an ocular and objective lens, a finger accommodation ring assembly and means for removably coupling said ring to said housing for enabling a user to insert his finger through said ring for viewing via said telescope in a first mode and to remove said ring from said housing in a second mode.

DETAILED DESCRIPTION OF THE INVENTION

Figure 1:
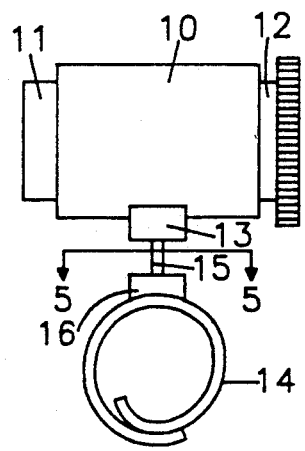
FIG. 1 is a side plan view of a telescope having a removable holding ring according to this invention.

Referring to FIG. 1, there is shown a side plan view of a telescope assembly and housing 10. The telescope assembly 10 consists of three cylindrical housings, namely a central housing 10, an ocular housing 11, which contains the ocular or eyepiece lens and an objective housing 12 which is slidably movable with respect to the housing 10 and the ocular section 11 to enable focussing of the same. Essentially such telescopes, as indicated above, may be utilized for various purposes to improve visual acuity and may have magnification powers up to 8 times or more. Such telescopes are relatively small and basically may be a few inches in length with diameters of ½ to 1½ inches.

As seen in FIG. 1 the central housing 10 of the telescope has a plate 13 mounted thereto. Attached to and projecting from the plate 13 is a post 15 to be inserted into the locking mechanism on a ring 14 which is coextensive and integrally formed with the ring 14. The ring 14 is dimensioned to accommodate a finger of a user and is adjustable in diameter to accommodate different users. The ring 14 may also be dimensioned to accommodate a finger with the specific ring finger size of the user. The post 15, as will be shown, contains flanges for removably securing the ring 14 to the housing 10 via the post 15. As seen, the ring 14 is adjustable as consisting of a formed rod bent into a circle with the ends of the rod abutting against one another to provide adjustability by varying the diameter of the ring. The ring 14 may also be formed of a rod bent into a closed circle.

Figure 2:
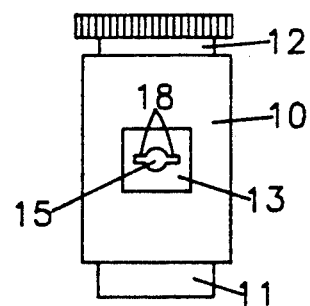
FIG. 2 is a bottom plan view of the telescope assembly showing a flanged post to be accommodated by the holding ring.

As seen in FIG. 2, the plate 13 receives and is attached to one end of a post 15 with two flanges 18 positioned on opposing sides of the post 15 at another end of the post 15 furthest from the plate 13. Each of the flanges 18 eminating from the post 15 are formed with an upstanding distal end 19 which forms a slot between the post 15 and the upstanding distal end 19. The importance of the distal end 19 on each flange 18 is described further on. The flanges 18 will be inserted into the locking mechanism and will then be twisted or rotated into position to removably secure the ring 14 to the housing 10.

Figure 3:
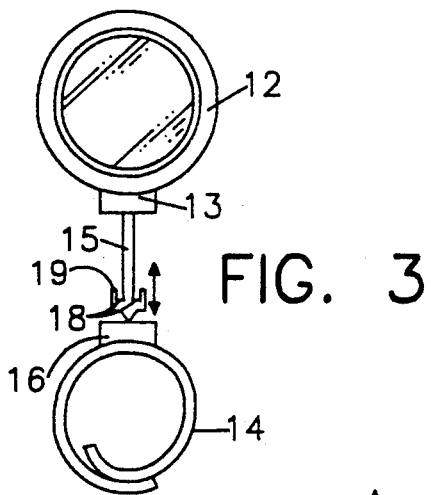
FIG. 3 is a side plan view of a holding ring and associated locking mechanism and post according to this invention.

Referring to FIG. 3, there is shown a side view of the ring 14. As indicated, the ring 14 is fabricated from a suitable metallic material and is or is not adjustable. The overlapping ends can be moved with respect to one another to provide adjustment according to the finger size. This means of adjustment is well known in the art.

Figure 5:
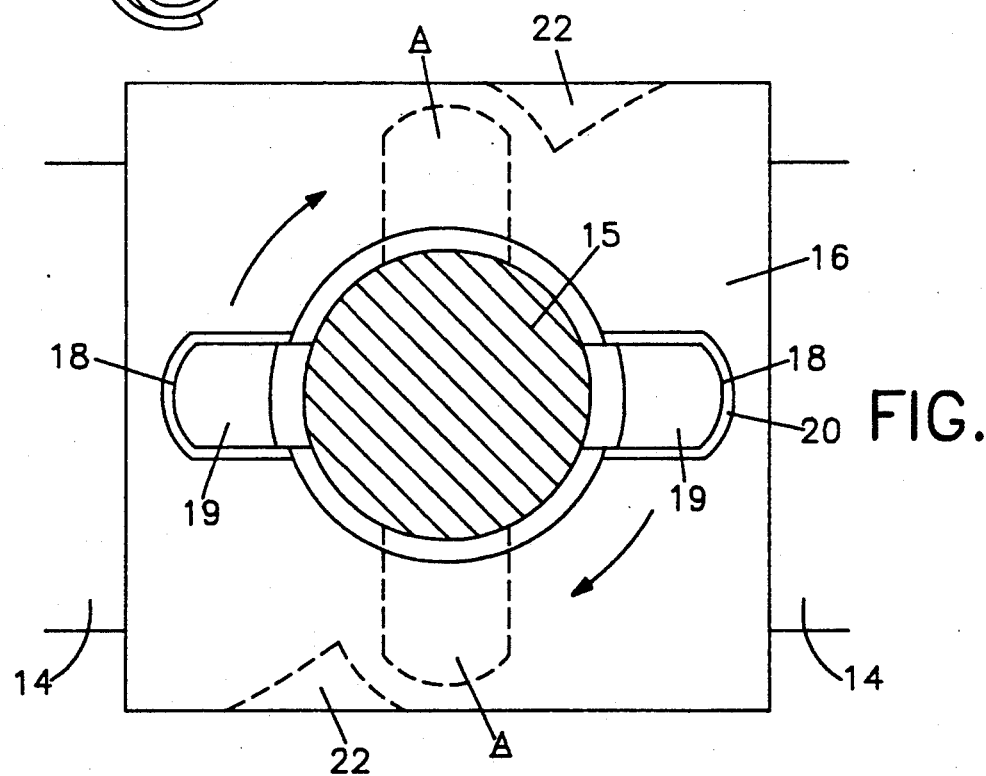
FIG. 5 is a larger scale top plan view taken through line 5—5 of FIG. 1 showing the locking mechanism of the holding ring assembly and the post/flange combination inserted into the locking mechanism to removably secure the telescope to the holding ring.

Secured to or integrally formed with the adjustable ring member 14 is the locking mechanism which is a latch 16 formed on the ring member 14. The post 15 is fabricated from metal and is inserted and withdrawn as shown in the direction of the arrows. The post 15 is inserted into a central aperture 20 formed in the latch 16 to accommodate the form and dimensions of the flanges 18 on the post 15. Once the post 15 and flanges 18 have been inserted into the central aperture 20 of the latch 16, either of the housing 10 or the ring member 14 may be twisted or rotated to bring the distal end 19 on each of the flanges 18, now within the latch 16, out of alignment with the central aperture 20 so that the distal ends 19 co-act with internal stopping members 22 (FIG. 5) within the latch 16 to hold the flanges 18 in a semi-locked position which will secure the housing 10 via the post 15 to the ring member 14. In this manner the ring member 14 can be inserted onto the housing 10 and secured. In order to remove the ring member 14 from the telescope assembly 10, one merely twists or rotates the ring member 14 or assembly 10 to release the semi-locked position of the distal ends 19 of the flanges 18 to align the flanges 18 with the central aperture 20, and then pulls the housing 10 away from the ring member 14, or vice versa.

Figure 4:
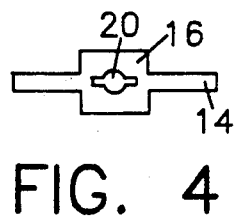
FIG. 4 is a top plan view showing the holding ring assembly locking mechanism of FIG. 3.

FIG. 4 shows a top view of the ring member 14 and locking mechanism. Here, the central aperture 20 dimensions in the latch 16 are apparent for receiving the left and right, if you will, flanges 18 of the post 15. The locking mechanism may be of a rectangular shape, as in FIGS. 4 and 5, or rounded to be circular or oval, as one's aesthetic preference will dictate.

FIG. 5 shows, again, the top view of the ring member 14 and the locking mechanism to a larger scale with dash lines depicting the co-acting of the flanges 18 and the internal stopping members 22 at the inside of the locking mechanism. When the post 15 with the flanges 18 is inserted into the central aperture 20, either the ring holder 14 or the telescope housing 10 may be twisted clockwise or counterclockwise (FIG. 5) to enable the upstanding distal ends 19 of the flanges 18 to semi-lock the flanges at a position "A" within the locking mechanism. To remove the ring member 14 from the telescope housing 10, one merely twists the ring member 14 or the housing 10 in the opposite direction to release the distal ends 19 so that the flanges 18 may be realigned with the central aperture 20 prior to removal. The main utilization of the apparatus is to enable one to remove the ring from the telescope assembly as desired. This accommodates easy storage and further enables one to utilize different telescope assemblies with different magnification powers without providing a new ring. In this manner the fact that the holding ring assembly is removable enables one to accommodate many different telescopes with various magnifications and further makes it easier for shipment and storage.

What is claimed is:

1. A telescope apparatus comprising:
   a telescope assembly housing containing an ocular and objective lens;
   a finger accommodation ring assembly including a latch with a central aperture having a left channel and a right channel and an internal stopping mechanism; and
   means for removably coupling said ring to said housing for enabling a user to insert his finger through said ring for viewing via said telescope in a first mode and to remove said ring from said housing in a second mode;
   said means including a post with a first end and a second end, said first end secured to said telescope housing and said second end having an outwardly extending left flange with an upstanding distal end forming a slot between said post and said upstanding distal end and opposite said left flange on said second end of said post an outwardly extending right flange with another upstanding distal end forming another slot between said post and said another upstanding distal end for insertion in said central aperture of said latch to co-act with said internal stopping mechanism for removably securing said ring to said housing.

2. The telescope apparatus according to claim 1, wherein said ring assembly is adjustable in diameter.

3. The telescope apparatus according to claim 1, wherein said telescope assembly is a Galilean telescope.

4. The telescope apparatus according to claim 1, wherein said telescope assembly is a Keplerian telescope.

5. The telescope apparatus according to claim 1, wherein said telescope assembly provides a magnification between 2-10 times.

6. The telescope apparatus according to claim 1, wherein said ring assembly comprises a single rod of metal formed as a ring with the ends of said rod abutting one another to enable the diameter of said ring to be adjusted.

7. The telescope apparatus according to claim 1 wherein said telescope assembly further includes a housing plate attached to and extending from said telescope assembly housing such that said first end of said post is attached to said telescope assembly housing via said housing plate.

* * * * *